Figure 4:
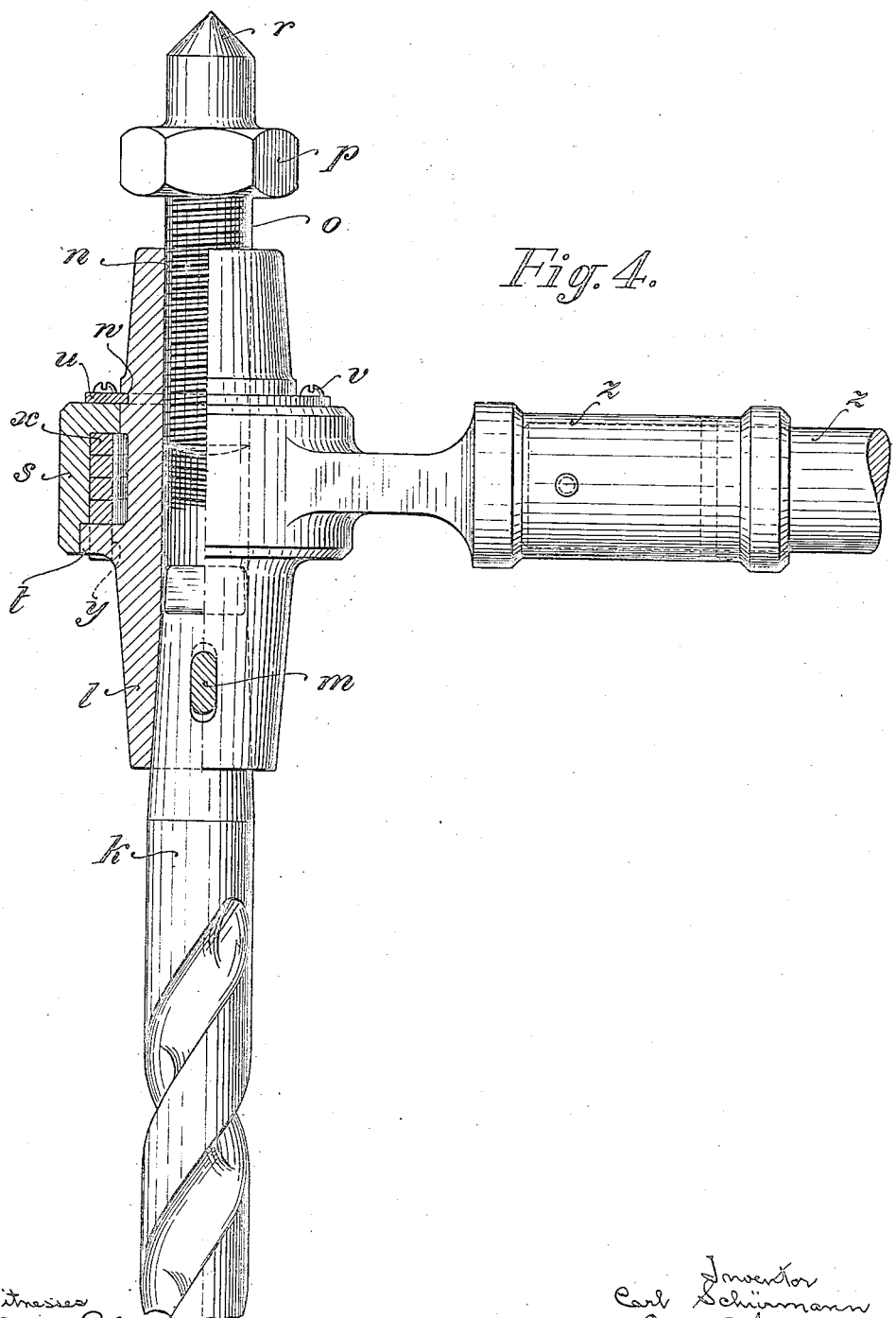

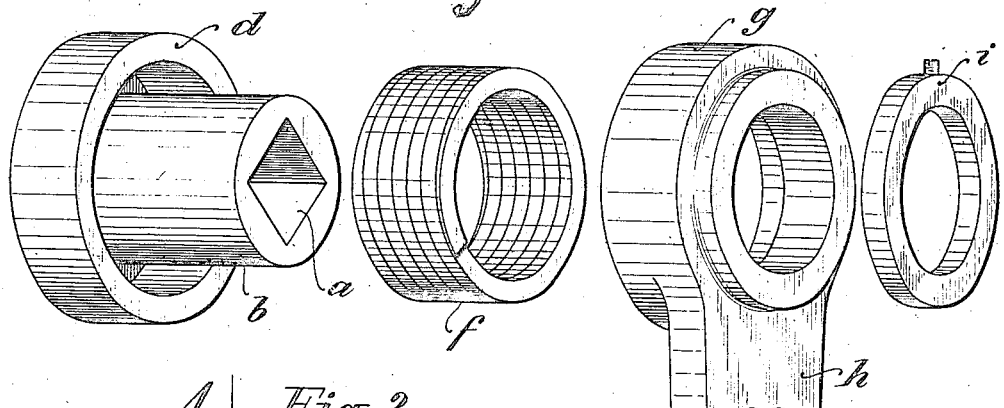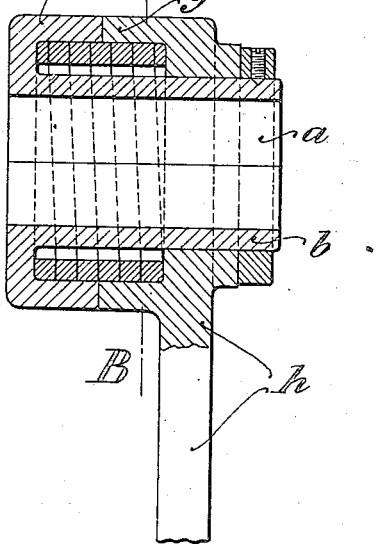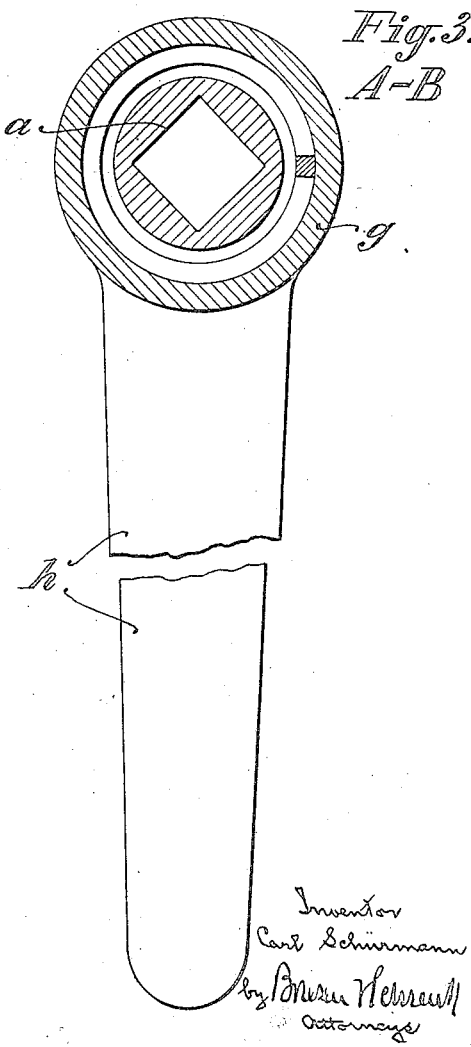

Patented Nov. 21, 1922.

1,436,407

UNITED STATES PATENT OFFICE.

CARL SCHÜRMANN, OF DUSSELDORF, GERMANY.

LEVER-RATCHET GEAR.

Application filed August 28, 1919. Serial No. 320,545.

*To all whom it may concern:*

Be it known that I, CARL SCHÜRMANN, a citizen of the German Republic, and residing at Dusseldorf, Germany, have invented certain new and useful Improvements in Lever-Ratchet Gears, of which the following is a specification.

The present invention relates to a lever ratchet gear for tools and machine-tools. The features of the gear according to the present invention are a very simple construction and a silent operation without any play in the feed direction. The gear will never fail and is subject to practically no wear whatever.

The new ratchet-gear according to the present invention consists essentially of a coiled spring which is coupled to two parts movable relatively to each other, of which parts at least one is of a round shape and frictionally cooperates with its cylindrical surface with the cylindrical surface of the said coiled spring, whilst the other part is rigidly attached to the said spring. The one of said parts is attached to the operating lever, whilst the other part is coupled to the tool or machine part to be operated. The spring allows of moving the operating lever freely in one direction, by said spring gliding with its surface on the round part. When the lever is swung in the opposite sense, the spring will, however, press against the wall of the said round part whereby a heavy friction is produced which couples this part with the spring and effects the operation of the tool or the like by means of the lever.

In the accompanying drawing the ratchet gear is shown by way of example.

Fig. 1 shows the various parts of the gear. Fig. 2 is a longitudinal section through the gear. Fig. 3 is a cross section on the line A—B in Fig. 2. Fig. 4 illustrates a twist drill in combination with the new gear, partly in elevation, partly in section.

The sleeve $b$ having a square bore $a$ is connected to a second shorter sleeve $d$, or, preferably, made in one piece with the same. In the sleeve $d$ is placed a coiled spring $f$, entering into the same with one half of its length. The other half of this spring fits into another sleeve $g$, which is secured to a lever $h$. The lever $h$ with the sleeve $g$ is rotatably fitted on the sleeve $b$ and is held thereon by means of a collar $i$. The outer diameter of the spring $f$ is a trifle larger than the bore of the sleeves $d$ and $g$ so that it has a tight fit in the same.

The square bore is fitted onto the machine part or the tool, respectively, to be operated. When the lever $b$ is swung in the one sense, the spring $f$ will be contracted, whilst it will expand when the said lever is swung in the opposite sense. The movement within the spring is naturally but a small one. If the spring has a right hand turn, the sleeve $g$ will glide over the outer surface of the spring when the lever $h$ is swung to the left, and the tool fitted in the square hole will remain stationary. When, thereupon, the lever $h$ is swung to the right, the friction between the sleeve and the outer surface of the spring will tend to uncoil the spring, so that the latter will be pressed more and more tightly against the inner wall of the sleeve $b$ and thereby the friction is increased. By such means the spring is seized by the sleeve. In the same manner, on the lever being swung to the right, the friction between the sleeve $d$ and the spring will tend to uncoil the latter, so that also here the pressure between spring and sleeve is increased in such a manner, that the tool in the bore $a$ is turned in the same sense.

Instead of the bore $a$ being square, the part $b$ may also have an eccentric stud which engages in a correspondingly eccentric bore in the part to be operated.

With the handpower drill shown in Fig. 4, the drill $k$ is fitted into a sleeve $l$ in which it is detachably held in known manner by means of a cotter $m$. The other end of the sleeve $l$ has a female thread $n$, into which screws a screw $o$, which has a hexagonal head $p$ and a center point $r$. On this sleeve $l$ is freely revolubly fitted another sleeve $s$, which on one side bears against a flange $t$ of sleeve $l$, and on the other side is held in position by a split collar or washer $u$, which is secured by aid of screws $y$ to the sleeve $s$, engaging with its inner edge into a groove $w$ in the sleeve $l$. In the cavity formed by the sleeve $l$ and the sleeve $s$ is snugly fitted a coiled spring $x$, the one end $y$ of which is bent over and engages in a hole provided in the flange $t$. To the sleeve $s$ is attached a handle $z$.

The handpower drill described is operated in the known manner. The drill is set against the work and the center point $r$ is screwed by means of screw $e$ tightly against an abutment, so that the point of the drill is pressed against the work. According to the cut of the tool the latter is fed by unscrewing the screw e from the sleeve l. If a left hand coiled spring x is employed, and the sleeve s is turned to the right by means of the handle z, the friction between sleeve d and spring x will tend to uncoil the latter whereby the friction between spring and sleeve is increased so that the moving sleeve will grip the spring and carry it along. Owing to its end being engaged in the sleeve l, the spring will then drive the said sleeve l and with it the drill. When the sleeve s is, by aid of its handle z, turned to the left, the small friction between sleeve s and spring x will coil up the latter a little, so that the friction between the said two parts is so far reduced that the sleeve guides over the spring. When, therefore the sleeve s is turned in this sense, the drill will remain stationary.

The same effect of the spring is secured if, instead of its outer surface frictioning with the surrounding sleeves, its inner surface coacts with a pin within the spring. When turned in the sense, which tends to contract the spring, the latter will drive the other part, whilst when turned in the opposite sense, the spring will tend to uncoil and will lift off from the pin so far that the two parts will glide on each other.

The part to be operated may also be rigidly attached to the corresponding part of the gear.

I claim:

In a manually operated tool, the combination of an inner sleeve provided with an axial recess for the reception of the element to be manipulated by said tool, an integral flange extending about said inner sleeve, an outer sleeve fitted exteriorly upon said inner sleeve and rotatably mounted thereon, said outer sleeve including a circumferential flange spaced from and surrounding said inner sleeve and bearing against the integral flange thereof, a collar fixed upon the inner sleeve and extending over the outer sleeve to prevent axial separation of said sleeves, a coil spring surrounding said inner sleeve within the circumferential flange of said outer sleeve, and an operating handle extending radially outward from said outer sleeve and adapted, when moved in one direction, to expand said spring into contact with said circumferential flange whereby said sleeves are coincidentally rotated, and when operated in the opposite direction, to contract said spring out of contact with said circumferential flange whereby said outer sleeve is rotated independently of the inner sleeve.

In testimony whereof I affix my signature.

CARL SCHÜRMANN.